United States Patent [19]

Javaherian

[11] Patent Number: 4,867,124
[45] Date of Patent: Sep. 19, 1989

[54] ADAPTIVE SPARK TIMING CONTROLLER FOR AN INTERNAL COMBUSTION ENGINE

[75] Inventor: Hossein Javaherian, Troy, Mich.

[73] Assignee: General Motors Corporation, Detroit, Mich.

[21] Appl. No.: 167,514

[22] Filed: Mar. 14, 1988

[51] Int. Cl.⁴ .............................................. F02D 5/15
[52] U.S. Cl. .................................................. 123/425
[58] Field of Search ................................ 123/425, 435

[56] References Cited

U.S. PATENT DOCUMENTS

| | | | |
|---|---|---|---|
| 4,304,203 | 12/1981 | Garcea et al. | 123/425 X |
| 4,449,501 | 5/1984 | Greeves | 123/425 |
| 4,465,046 | 8/1984 | May | 123/425 |
| 4,596,218 | 6/1986 | Karau et al. | 123/425 |
| 4,621,603 | 11/1986 | Matekunas | 123/425 |
| 4,622,638 | 11/1986 | Anderson et al. | 123/425 X |
| 4,622,939 | 11/1986 | Matekunas | 123/425 |
| 4,624,229 | 11/1986 | Matekunas | 123/425 |

Primary Examiner—Tony M. Argenbright
Attorney, Agent, or Firm—Howard N. Conkey

[57] ABSTRACT

An adaptive ignition controller for an internal combustion engine provides for engine operation at substantially peak thermal efficiency for all engine operating conditions by controlling the ignition advance angle intiating combustion to a crankshaft angle before top dead center that is substantially equal to the crankshaft angle after top dead center at which combustion is completed.

2 Claims, 2 Drawing Sheets

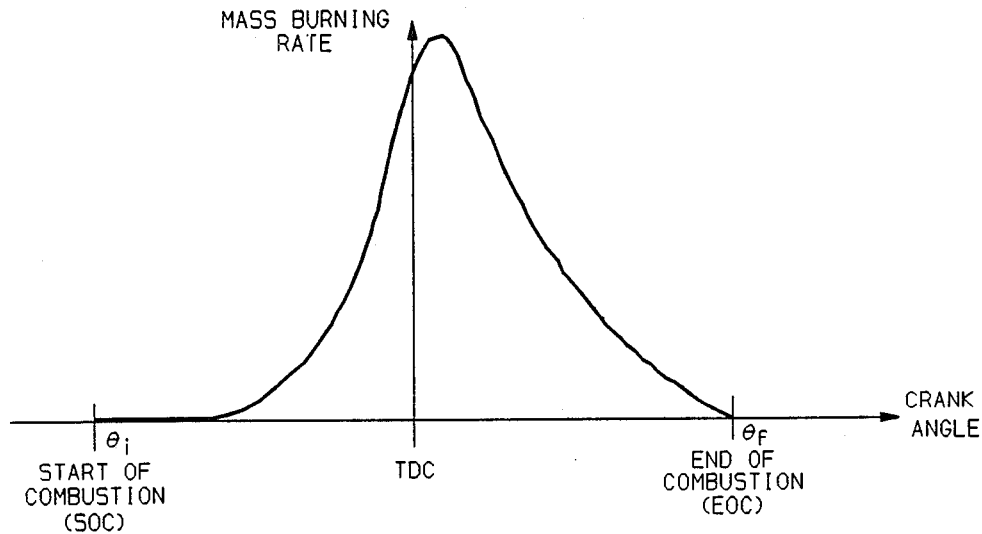
FIG. 1
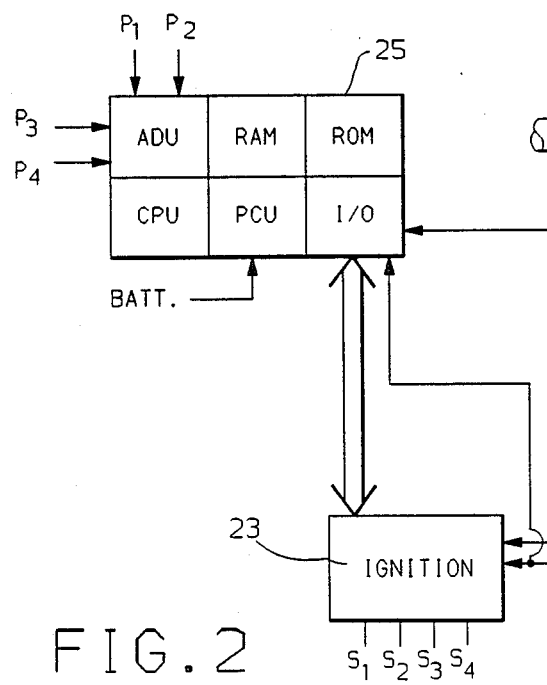
FIG. 2
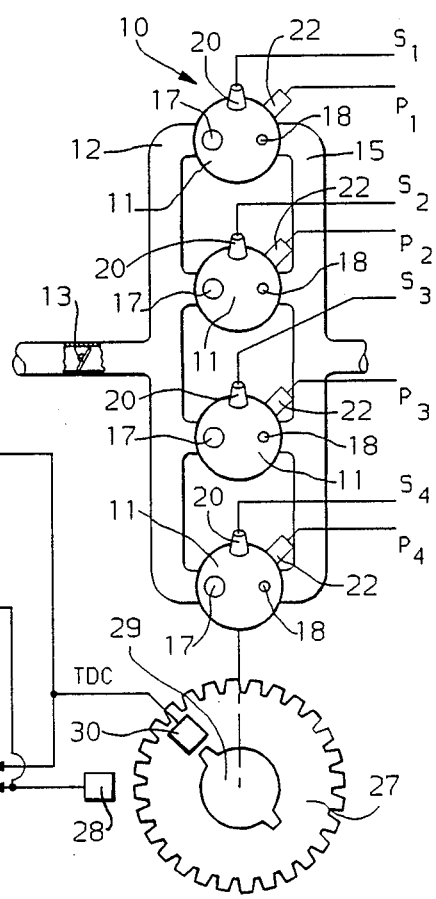

ADAPTIVE SPARK TIMING CONTROLLER FOR AN INTERNAL COMBUSTION ENGINE

BACKGROUND OF THE INVENTION

This invention relates to spark timing control in an internal combustion engine, and particularly to a system for adaptively controlling engine spark timing to achieve substantially peak thermal efficiency.

Typical spark timing control systems for internal combustion engines sense a set of spark timing dependent variables, such as engine coolant temperature, engine speed and engine load, and adjust the ignition timing to a prescribed calibration for a baseline engine. Generally in these systems, the spark timing angle is retrieved from stored tables addressed by the spark timing dependent variables with additional retard, in some cases, in response to knock, manifold absolute pressure or a throttle movement detector. A problem with this approach is that, because of manufacturing differences and aging, the engine being controlled is not necessarily the same as the baseline engine used for reference. One approach to the solution of this problem requires extensive effort in the design of the engine to ensure both that all combustion chambers behave the same and that components will not significantly alter characteristics with aging. Even with such design and type quality control in the manufacturing process, the required uniformity and stability over time of such engines cannot always be achieved.

Closed loop control of spark timing has been suggested in the prior art in various forms. Location of peak pressure spark timing control systems have been proposed in which spark timing is controlled to maintain a predetermined location of peak combustion pressure. This timing of peak combustion pressure has been found to produce MBT operation for many engine operating conditions. The location of peak pressure may be sensed using head bolts with an embedded piezoelectric material which responds to the stress created in reaction to the pressure on the engine cylinder head.

However, this approach has difficulties when the combustion charge is highly dilute or the engine is under light load.

Some systems have been suggested which adjust ignition timing to control the maximum absolute combustion pressure with respect to some predetermined reference level. There is, in addition, a suggestion in the Greeves U.S. Pat. No. 4,449,501 issued May 22, 1984, that ignition timing may be controlled to maintain the ratio of maximum combustion chamber pressure to maximum motored pressure in accordance with a stored table addressed by engine speed and load factors. These approaches, however, involve stored references determined for a baseline engine which may not be the desired reference for the particular engine at any given time.

SUMMARY OF THE INVENTION

The primary object of this invention is to provide for adaptive control of the spark timing of an internal combustion engine for achieving substantially the minimum advance for best torque (MBT) resulting in substantially peak thermal efficiency. It has been found that the peak thermal efficiency of an internal combustion engine can approximately be achieved by locating the combustion process in an engine cylinder so that it is centered at the point of minimum combustion chamber volume hereinafter referred to as top dead center (TDC). In other words, the subject invention provides for the achievement of the peak thermal efficiency by centralizing the combustion process at TDC such that the combustion is completed at an angle $\theta_f$ after top dead center (ATDC) approximately equal to the ignition advance angle $\theta_i$ before top dead center (BTDC). Typically, the spark advance is slightly retarded from MBT. However, it has been found that while the combustion timing is slightly retarded from MBT resulting in a very small efficiency loss, the engine emission of nitrogen oxides is significantly reduced.

Since this invention is invariant under changes in engine variables and/or parameters, an adaptive method that will ensure substantially peak fuel economy under all operating conditions can then be provided. Since this invention is process based in contrast to a model based system, it does not involve any significant data processing and can be employed in an on-line engine power control system on a cycle-to-cycle basis. In carrying out this invention, the end of combustion (EOC) of a particular cylinder is determined and compared with the start of combustion angle relative to TDC. The start of combustion angle is then controlled to be substantially equal to the end of combustion angle relative to top dead center.

Further details and advantages will be apparent from the accompanying drawings and the following description of a preferred embodiment.

SUMMARY OF THE DRAWINGS

FIG. 1 is a schematic diagram of the mass burning rate of the mixture in the combustion chamber of a cylinder between the start of combustion angle and the end of combustion angle of the cylinder.

FIG. 2 is a schematic diagram of an engine with a control according to this invention.

Referring to FIG. 1, there is illustrated a diagram of the mass burning rate in the combustion chamber of an engine beginning with the start of combustion angle $\theta_i$ and the end of combustion angle $\theta_f$. As hereinafter used, $\theta_i$ is the magnitude of the crank angle in advance of the cylinder top dead center at which combustion starts (which may be represented by the spark advance angle) and $\theta_f$ is the magnitude of the crank angle after top dead center at which the end of combustion occurs. As previously indicated, the peak thermal efficiency of the engine can be approximately achieved by centralizing the combustion event as depicted in FIG. 1 at TDC such that the end of combustion angle $\theta_f$ approximately equal to the start of combustion angle $\theta_i$.

Referring to FIG. 2, there is depicted a system for controlling the combustion process in the cylinders of an internal combustion engine so that the start of combustion angle $\theta_i$ is controlled to a value substantially equal to the end of combustion angle $\theta_f$ relative to top dead center. An internal combustion engine 10 is depicted which, in this embodiment, is a spark ignited engine having four combustion chambers or cylinders 11, an intake manifold 12 and a rotating crankshaft, not shown, through which power is transferred from the cylinders 11 to the vehicle drive train. Each cylinder 11 is provided with an intake valve 17 communicating with the intake manifold 12, an exhaust valve 18 communicating with the exhaust manifold 15, a spark plug 20 and a combustion chamber pressure sensor 22. Fuel drawn into the cylinders 11 through the intake valves 17 is provided by fuel injectors, not illustrated. Also, a number of other parameter sensors may be employed for controlling various engine operating functions including fuel injection quantities. These parameters may include, for example, engine temperature and mass air flow into the engine.

Figure 3:
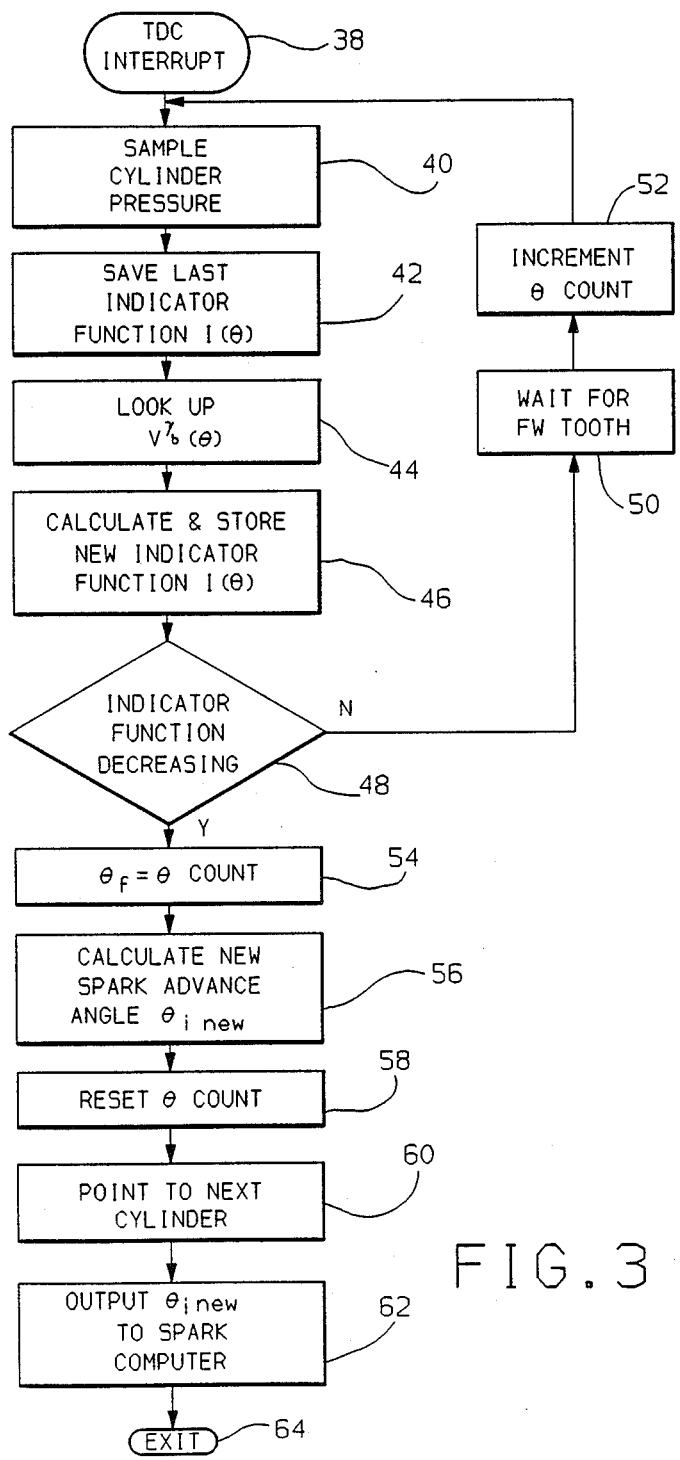
FIG. 3 is a diagram illustrating the operation of the controller of FIG. 2 in carrying out the principles of this invention.

While a particular engine configuration has been illustrated, the invention is applicable to other configurations including engines having a fewer number of cylinders and a different number of valves and spark plugs for each cylinder.

The spark plugs 20 are controlled by an ignition circuit 23 in response to timing values provided by a digital computer 25. The digital computer 25 is standard in form and includes a central processing unit (CPU) which executes an operating program permanently stored in a read only memory (ROM) which also stores tables and constants utilized in controlling the timing angle of the ignition of the fuel via the spark plugs 20. Contained in the CPU are conventional counters, registers, accumulators, flag flip flops, etc., along with a clock which provides a high frequency clock signal.

The digital computer 25 also includes a random access memory RAM) into which data may be temporarily stored and from which data may be read at various address locations determined in accord with the programs stored in the ROM. A power control unit (PCU) receives vehicle battery voltage and provides regulated power to the various operating circuits.

The computer further includes an input/output circuit (I/O) comprised of an output section that provides the required spark advance value to the ignition circuit 23 for establishing the timing angle for the spark plugs 20 in accord with this invention. In addition, other signals that may be required by the ignition circuit 23 are provided by the digital computer 25 and may include, for example, the clock signal provided by the clock in the CPU.

The I/O also includes an input section for receiving engine rotation and position signals as will be described. These signals are utilized by the computer 25 in determining the end of combustion angle $O_f$ depicted in FIG. 1. In addition, the signals may be utilized by the digital computer 25 in establishing engine speed as required for engine control.

An analog-to-digital unit (ADU) provides for the measurement of the pressure signals $P_1$, $P_2$, $P_3$ and $P_4$ corresponding to the respective outputs of the four pressure sensors 22 monitoring the pressure in the cylinders of the engine 10. These pressure signals are sampled and converted under control of the CPU and the program stored in the ROM as will be described.

The ignition circuit 23 responds to the spark advance angle command by the digital computer 25 and provides a high voltage pulse to activate a spark plug 20 and to direct the pulse to the proper plug. These pulses are illustrated as the signals $S_1$, $S_2$, $S_3$ and $S_4$ in FIG. 2. The ignition circuit 25 may include a standard distributor for directing the pulse to the proper plug and may take any appropriate form from the prior art. For example, the ignition circuit 23 may take the form of the engine control unit and distributor illustrated in the Motz U.S. Pat. No. 4,231,091 issued Oct. 28, 1980 which responds to commands from a digital computer for providing high voltage pulses to spark plugs of an internal combustion engine.

Combustion chamber pressure sensors 22 may be any known type of pressure sensor adapted or adaptable to sensing the pressure inside the combustion chambers 11. One such sensor is a piezoelectric deflection type of transducer which includes a finger projecting through the cylinder water jacket to sense pressure caused deflections of the combustion chamber wall. Another sensor that may be utilized is a piezoelectric sensor attached directly to the combustion chamber wall. Sensors with membranes of piezoelectric or other materials (such as fiber optics) exposed directly to the combustion chamber interior are combined with the spark plug may also be used. However, in the embodiment to be described, it is not required that the pressure transducer be calibrated, the system responding only to the uncalibrated output of the pressure transducer.

Signals indicative of crankshaft rotational position and signals representing the top dead center position of each of the cylinders of the engine 10 are provided by transducers rotated by the output crankshaft of the engine 10. Particularly, signals indicative of crankshaft rotational position are provided to the digital computer 25 and the ignition circuit 23 by a ring gear 27 having teeth spaced around its periphery and which is rotated by the crankshaft. While other intervals may be used, in this embodiment, the teeth are spaced at one degree intervals around the periphery of the ring gear 27. An electromagnetic sensor 28 is positioned to sense the teeth on the ring gear as it is rotated by the engine crankshaft to provide crank position pulses to the ignition circuit 23 and the digital computer 25.

The signals representing the top dead center position (TDC) of each of the cylinders of the engine 10 is provided by a disc member 29 also rotated by the crankshaft and which has teeth spaced at 180 degree intervals. An electromagnetic sensor 30 is positioned to sense the teeth on the member 29 for providing a pulse to the ignition circuit 23 and the digital computer 25 at each piston top dead center position.

The digital computer 25 responds to each top dead center signal output of the sensor 29 to initiate an operating program stored in the ROM for determining the end of combustion angle $\theta_f$ and to provide for the adjustment to the spark advance angle $\theta_i$ so that it is approximately equal to the end of combustion angle $\theta_f$.

The flow diagram of FIG. 3 illustrates the series of steps in the stored routine that are executed by the digital computer 25 in response to each signal indicative of engine top dead center to determine the end of combustion angle $\theta_f$ and to establish a spark advance angle $\theta_i$ equal to $\theta_f$. The programming of the digital computer 25 to implement the series of steps as set forth in FIG. 3 may be accomplished by any programmer skilled in the art of engine control.

In response to a top dead center signal provided by the electromagnetic sensor 30, the computer 25 initiates a top dead center interrupt routine that begins at point 38 and then proceeds to execute a series of steps for determining the end of combustion crank angle $\theta_f$. Any method of determining the end of combustion may be utilized in the subject invention. For example, one embodiment may employ an optical fiber to detect the flame luminosity in the combustion chamber during combustion and a photo diode to convert the measured light intensity into an electric voltage. When the flame extinguishes, a drop in the luminosity and the sensed voltage output of the photo diode produces an indication of the end of combustion. However, in the present embodiment, the end of combustion angle $\theta_f$ is determined by determining the crankshaft angle $\theta$ at which an indicator function $I(\theta)$ is at a peak where $I(\theta)$ is defined by:

$$I(\theta) = P(\theta) V^{\gamma_b}(\theta) \tag{1}$$

where P is the cylinder pressure measured by the respective transducer 22 of FIG. 2, V is the combustion chamber volume which is a known value at a given crankshaft angle and $\gamma_b$ is the mean heat capacity ratio of the combustion products. The value of $\gamma_b$, for an air/fuel mixture is assumed to be a constant such as 1.25. Alternatively the end of combustion angle $\theta_f$ may be determined by determining the crankshaft angle $\theta$ at which an equivalent indicator function $J(\theta)$ is zero where $J(\theta)$ is defined by the differential relation:

$$J(\theta) = (1/P)(dP/d\theta) + (\gamma_b/V)(dV/d\theta) \tag{2}$$

The use of the indicator function $I(\theta)$ is preferred particularly when the effect of noise on the combustion pressure is significant such that it would be desirable to eliminate the requirement for pressure differentiation. As can be seen, the indicator function $I(\theta)$ depends only on the total pressure and does not require any transducer calibration.

The pressure transducer bias is estimated on-line but its gain is not needed. The pressure offset is derived from the fact that the process during the compression stroke between any two close points (e.g. 90±10 degrees BTDC) can be taken to be adiabatic. Let the actual pressure be P, the measure pressure $P_m$, transducer offset $P_{off}$ and the transducer gain K. Then:

$$P = K(P_m + P_{off}). \tag{3}$$

For the adiabatic process where $\overline{PV^\gamma}$ is constant and for any two points we have:

$$P_1/P_2 = (V_2/V_1)^\gamma \tag{4}$$

or $$K(P_{m1} + P_{off})/K(P_{m2} + P_{off}) = (V_2/V_1)^\gamma \tag{5}$$

From the above relation, the pressure offset is determined as $$P_{off} = \{P_{m2}(V_2/V_1)^\gamma - P_{m1}\}/\{1 - (V_2/V_1)^\gamma\}$$

Returning again to FIG. 3, following the step 38 initiating the interrupt routine, the program repeatedly executes a series of steps to repeatedly determine the value of the indicator function I with respect to the crank angle $\theta$ as the crankshaft rotates until a peak of the indicator function is detected. The crankshaft angle $\theta$ after TDC at which this peak is detected comprises the end of combustion angle $\theta_f$. This routine begins at step 40 where the pressure P in the cylinder corresponding to the TDC pulse last provided by the sensor 29 is sampled and stored.

At step 42, the last determined value of the indicator function $I(\theta)$ is saved in a ROM designated RAM memory location. If this is the first execution of the step 42 since the TDC interrupt routine was initiated, this stored value will be zero. Thereafter, this stored value will be the last value calculated as will be described. This saved value of the indicator function will be used in the sensing of the peak value of the function.

At the next step, the program determines the value of $V^{\gamma_b}(\theta)$. In this embodiment, this value is retrieved from a lookup table of values stored in the ROM as a function of the angle $\theta$ after top dead center position. A value of $V^{\gamma_b}$ is stored for each angle of crankshaft position beginning at top dead center in one angular degree intervals. It is readily apparent that the volume V of the cylinder at each angular position can be determined from which the value $V^{\gamma_b}$ is calculated and then stored in the ROM lookup table. The angle after top dead center to be used in retrieving the value of $V^{\gamma_b}(\theta)$ is obtained from a RAM memory location (referred to hereafter as a $\theta$ count register) that is incremented as will be described upon the sensing of each tooth on the ring gear 27 and which contains the value of the crankshaft angular position after top dead center.

After the value of $V^{\gamma_b}(\theta)$ is obtained, the program proceeds to a step 46 where the value of the indicator function $I(\theta)$ is calculated and stored in accord with equation (1) based on the pressure sampled at step 40 and the value of $V^{\gamma_b}$ retrieved at step 44. At step 48, the program determines whether or not the last value of the indicator function calculated and stored at step 46 is greater than the previous indicator function saved at step 42. Assuming the steps 40 through 48 are being executed for the first time since the top dead center interrupt routine was initiated, the last indicator function value saved at step 42 is zero so that the step 48 determines an increase in the value of the indicator function. Therefore, the program proceeds to a step 50 where it waits for the next sensing of a flywheel tooth by the electromagnetic sensor 28.

When the next tooth is detected indicating a rotation of the engine over an angle represented by the spacing of the teeth on the ring gear 27 (one degree in this embodiment), the program proceeds to a step 52 where the $\theta$ count register containing a count representing the angular position of the crankshaft after top dead center is incremented. The count in this register represents the angular position of the crankshaft after top dead center of the engine with each count representing an angle of rotation equal to the spacing of the teeth on the flywheel ring gear 27.

From step 52, the program returns to step 40 wherein the steps 40, 42, 44, 46 and 48 are repeated as previously described for the new values of cylinder pressure and cylinder volumes determined at steps 40 and 44 at the new crankshaft angle. The execution of step 42 serves to save the value of the indicator function determined during the prior execution of the step 46 which is compared at step 48 with the new value of the indicator function determined at step 46. As long as the value of the indicator function is increasing, the foregoing steps including steps 50 and 52 are repeated at each incremental angular position determined by the spacing of the teeth on the ring gear 27.

When the step 48 determines that the indicator function last calculated at step 46 is less than the previously determined value saved at step 42, the indicator function has peaked representing end of combustion. At this point, the crankshaft angle stored in the $\theta$ count register incremented at step 52 represents the end of combustion angle $\theta_f$. When this condition is sensed, the program then proceeds to a step 54 where the angle $\theta_f$ is set equal to the angle represented by the count in the $\theta$ count register.

At the next step 56, the spark advance angle, which is equivalent to the start of combustion angle $\theta_i$, is adjusted toward the value of the end of combustion angle $\theta_f$ in accord with the expression $$\theta_{inew} = \theta_{iold} + K(\theta_f - \theta_{iold}) \tag{6}$$

where $\theta_{inew}$ is the new spark advance angle, $\theta_{iold}$ is the prior spark advance angle and $\theta_f - \theta_{iold}$ represents the error in the spark advance angle. This expression is in the form of a first order lag equation where K represents the time constant of the expression. This provides for increased stability of the spark advance value at the expense of a slower response time in the elimination of a sensed error in the spark advance angle. In one embodiment, the value of K was set equal to 0.5. However, this gain factor is a calibration value that may be adjusted depending upon system requirements.

Following the determination of the new spark advance angle $\theta_{inew}$, the program proceeds to a step 58 where the $\theta$ count register previously incremented at step 52 is reset and the value of the indicator function $I(\theta)$ is reset to zero so as to initialize the routine for the next cylinder to undergo combustion. Thereafter, the program proceeds to step 60 where it points to the next cylinder so that the execution of the next top dead center interrupt routine is provided in relation to the next cylinder to undergo combustion.

At step 62, the program provides the new spark advance angle to the ignition circuit 23 so as to establish the spark advance angle as calculated by the routine of FIG. 3 to a value substantially equal to the end of combustion angle $\theta_f$. By the series of steps as illustrated in FIG. 3, the spark advance angle is continually updated in adaptive manner so as to continuously provide substantially the peak thermal efficiency of the engine for all engine operating conditions.

The foregoing description of a preferred embodiment of the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for determining the ignition timing value in an ignition control system for an internal combustion engine having cylinders and an output crankshaft rotated during operation of the engine, the ignition control system initiating combustion in each cylinder of the engine at the determined ignition timing value, the system comprising, in combination:

means for sensing the end of combustion in a cylinder of the engine, the means for sensing including means for determining when an indicator function I is at a peak as the crankshaft rotates, the indicator function being defined by the expression $$I = PV^{\gamma_b}$$

where P is the pressure in the cylinder, V is the volume in the cylinder and $\gamma_b$ is the mean heat capacity ratio of the combustion products, a peak in the indicator function representing the end of combustion;

means for determining the magnitude of the crankshaft angle after top dead center of the cylinder at which the end of combustion in the cylinder was sensed, the determined magnitude comprising an end of combustion angle $\theta_f$; and means for establishing the ignition timing value at a start of combustion angle $\theta_{inew}$ in advance of top dead center of the cylinders having a predetermined relationship to the determined magnitude of the end of combustion angle.

2. A system for adaptively controlling the ignition timing value in an ignition control system for an internal combustion engine having cylinders and an output crankshaft rotated during operation of the engine so as to establish substantially peak thermal efficiency in the engine for a wide range of engine operating parameters, the system comprising:

means effective at each of sequential angular positions of the crankshaft during combustion in a cylinder for (A) sensing the pressure in the cylinder (B) determining the value of $V^{\gamma_b}$ where V is the volume of the cylinder corresponding to the crankshaft angular position and $\gamma_b$ is the mean heat capacity ratio of the combustion products and (C) determining the value of $PV^{\gamma_b}$;

means for sensing a peak in the determined value of $PV^{\gamma_b}$, a peak in the determined value of $PV^{\gamma_b}$ representing end of combustion in the cylinder;

means for determining the magnitude of the crankshaft angle $\theta_f$ after top dead center of the cylinder at which the peak in the determined value of $PV^{\gamma_b}$ was sensed; and means for initiating combustion in the cylinders of the engine at a start of combustion angle in advance of top dead center of the cylinders having a predetermined relationship to the determined magnitude of the crankshaft angle $\theta_f$.

* * * * *